US006593539B1

(12) United States Patent
Miley et al.

(10) Patent No.: US 6,593,539 B1
(45) Date of Patent: Jul. 15, 2003

(54) APPARATUS AND METHODS FOR CONTROLLING CHARGED PARTICLES

(76) Inventors: George Miley, 912 W. Armory, Champaign, IL (US) 61820; Hiromu Momota, 2038 Hazelwood Ct., Urbana, IL (US) 61801

( * ) Notice: Subject to any disclaimer, the term of this patent is extended or adjusted under 35 U.S.C. 154(b) by 88 days.

(21) Appl. No.: 09/793,335

(22) Filed: Feb. 26, 2001

Related U.S. Application Data

(60) Provisional application No. 60/184,963, filed on Feb. 25, 2000, provisional application No. 60/218,894, filed on Jul. 18, 2000, and provisional application No. 60/263,603, filed on Jan. 23, 2001.

(51) Int. Cl.[7] .............................................. B23K 10/00
(52) U.S. Cl. ........................... 219/121.36; 219/121.52; 219/123; 376/127; 315/111.51
(58) Field of Search ........................... 219/121.36, 123, 219/121.43, 121.52; 315/111.51, 111.71, 111.31; 313/231.41; 376/1–4, 127–129, 107–109

(56) References Cited

U.S. PATENT DOCUMENTS

| 3,258,402 A | 6/1966 | Farnsworth |
| 3,386,883 A | 6/1968 | Farnsworth |
| 3,448,315 A | 6/1969 | Hirsch et al. |
| 3,530,497 A | 9/1970 | Hirsch et al. |
| 4,091,336 A | 5/1978 | Miley et al. ............ 331/94.5 P |
| 4,121,971 A | 10/1978 | Marwick ....................... 176/39 |
| 4,333,796 A | 6/1982 | Flynn .......................... 376/100 |
| 4,826,626 A | 5/1989 | Whittaker ................ 252/408.1 |
| 4,826,646 A | 5/1989 | Bussard ...................... 376/129 |
| 5,160,695 A | 11/1992 | Bussard ...................... 376/107 |
| 5,160,696 A | 11/1992 | Bowman ..................... 376/189 |
| 5,774,514 A | 6/1998 | Rubbia ........................ 376/193 |
| 6,121,569 A | 9/2000 | Miley et al. ........... 219/121.48 |
| 6,171,451 B1 | 1/2001 | Miley et al. ................ 204/173 |

Primary Examiner—Mark Paschall
(74) Attorney, Agent, or Firm—Woodard, Emhardt, Moriarty, McNett & Henry LLP

(57) ABSTRACT

Among the embodiments of the present invention, are apparatus, systems, and methods for managing energetic charged particles emitted nearly isotropically from a fusion device. One apparatus of the present invention includes a fusion device in a container and an electric current carrying winding disposed about the container to provide a magnetic field to direct charged particles generated by the device. A pair of electric current carrying coils are positioned within the container to control the strength of the magnetic field in a region between these coils, such that effects on fusion plasma can be minimized. In other forms, charged particles provided from a fusion device are directed along a magnetic channel to an energy converter to provide electric power. One such form includes a magnetic expander and an electron-ion separator to provide a net electric current.

33 Claims, 10 Drawing Sheets

APPARATUS AND METHODS FOR CONTROLLING CHARGED PARTICLES

CROSS-REFERENCE TO RELATED APPLICATIONS

The present application claims the benefit of U.S. Provisional Patent Application No. 60/184,963 filed Feb. 25, 2000; U.S. Provisional Patent Application No. 60/218,894 filed Jul. 8, 2000; and U.S. Provisional Patent Application No. 60/263,603 filed Jan. 23, 2001, all of which are hereby incorporated by reference.

BACKGROUND

The present application relates to techniques involving plasma and/or charged particles, and more specifically, but not exclusively, relates to the management of particles generated by fusion devices such as those based on Inertial Electrostatic Confinement (IEC). Alternatively or additionally, it is envisioned the teachings of the present application can be applied to other areas of technology.

Inertial electrostatic confinement involves confining a plasma with electrically biased electrodes that accelerate ions of the plasma into a hollow cathode-grid. Inertial electrostatic confinement technology can be utilized in a number of different applications including the generation of plasma jets, the provision of charged particle beams, the formation of complex carbon molecules, and the promotion of various nuclear fusion reactions, to name just a few. Among the factors that make inertial electrostatic confinement and similar fusion techniques attractive is that fusion reaction products leave the hot plasma with no or little energy loss to the plasma, resulting in a fairly monoenergetic flux of high-energy ions. U.S. Pat. Nos. 6,121,569 and 6,171,451 B1, and International Application No. PCT/US96/05185 (International Publication Number WO 95/30235) to Miley et al.; U.S. Pat. Nos. 3,258,402 and 3,386,883 to Farnsworth; U.S. Pat. Nos. 3,448,315 and 3,530,497 to Hirsch et al.; and U.S. Pat. Nos. 4,826,646 and 5,160,695 to Bussard are cited as further sources of background information concerning various fusion devices, and are all hereby incorporated by reference.

Typically, charged fusion products are born with an isotropic angular distribution and then escape with a widely spread distribution of directions. However, for a variety of applications, such as propulsion, medical treatments, industrial processes, and some types of electrical energy conversion, a more organized charged particle beam is often desired. Thus, there is a demand for ways to control and manage escaping charged particles in general. Accordingly, an ongoing need exists for advancements in this area of technology.

SUMMARY

One embodiment of the present invention is a unique technique involving charged particles. Other embodiments include unique apparatus, systems, and methods to control, manage, and/or direct charged particles generated by inertial electrostatic confinement.

A further embodiment of the present invention includes one or more inertial electrostatic confinement devices to provide charged particles and one or more energy converters to provide electric power from at least a portion of the charged particles. In one form, this embodiment utilizes an electrostatic converter that separates high-energy charged particles from low-energy charged particles. Such a converter facilitates processing of the separated, high- and low-energy components by different apparatus. This electrostatic converter can be arranged to produce electricity by collecting low-energy electrons and low-energy, positively charged ions with different collectors and another converter can be utilized to provide electricity from the high-energy particles.

In yet a further embodiment of the present invention, charged particles are generated with a fusion reaction device and are directed along a channel with a magnetic field. A pair of coils is operated in this magnetic field that are spaced apart from one another along the channel. These coils are operated to control strength of the magnetic field in a space between the two coils. The fusion reaction device can be based on inertial electrostatic confinement.

In still a further embodiment of the present invention, an apparatus includes an inertial electrostatic confinement device that comprises a container and one or more electrodes disposed within the container. A magnetic field is generated to direct charged particles emitted by this device. A pair of coils are also included in the apparatus that are positioned inside the container. The electrode(s) of the electrostatic confinement device is/are located between these coils. The coil pair is operable to control the magnetic field in the vicinity of the electrode(s). Such control can include the reduction or substantial elimination of the magnetic field in the central region of the electrode(s). The apparatus can further include a stabilizing coil positioned between the pair of coils and about the electrode(s).

Another embodiment of the present invention includes a source to provide charged particles, a winding to generate a magnetic field channel to direct the charged particles, a pair of spaced apart coils to control the magnetic field channel between these coils, and one or more charged particle collectors. The charged particle collectors are disposed adjacent the coil pair and about the magnetic field channel when generated with the winding. The one or more charged particle collectors are operable to separate low-energy charged particles from high-energy charged particles and/or convert the kinetic energy of at least a portion of the charged particles to electrical power. In one form, the lower energy electrons and lower energy, positively charged ions are collected with different collectors to provide electricity.

Accordingly, one object of the present invention is to provide one or more techniques to manage charged particles. These charged particles could be generated by fusion reactions. Another object of the present invention is to provide apparatus, methods, and/or systems to control, manage, or direct charged particles generated with inertial electrostatic confinement.

Further objects, embodiments, forms, features, advantages, benefits, and aspects of the present invention shall become apparent from the detailed description and drawings contained herewith.

DETAILED DESCRIPTION

Figure 1:
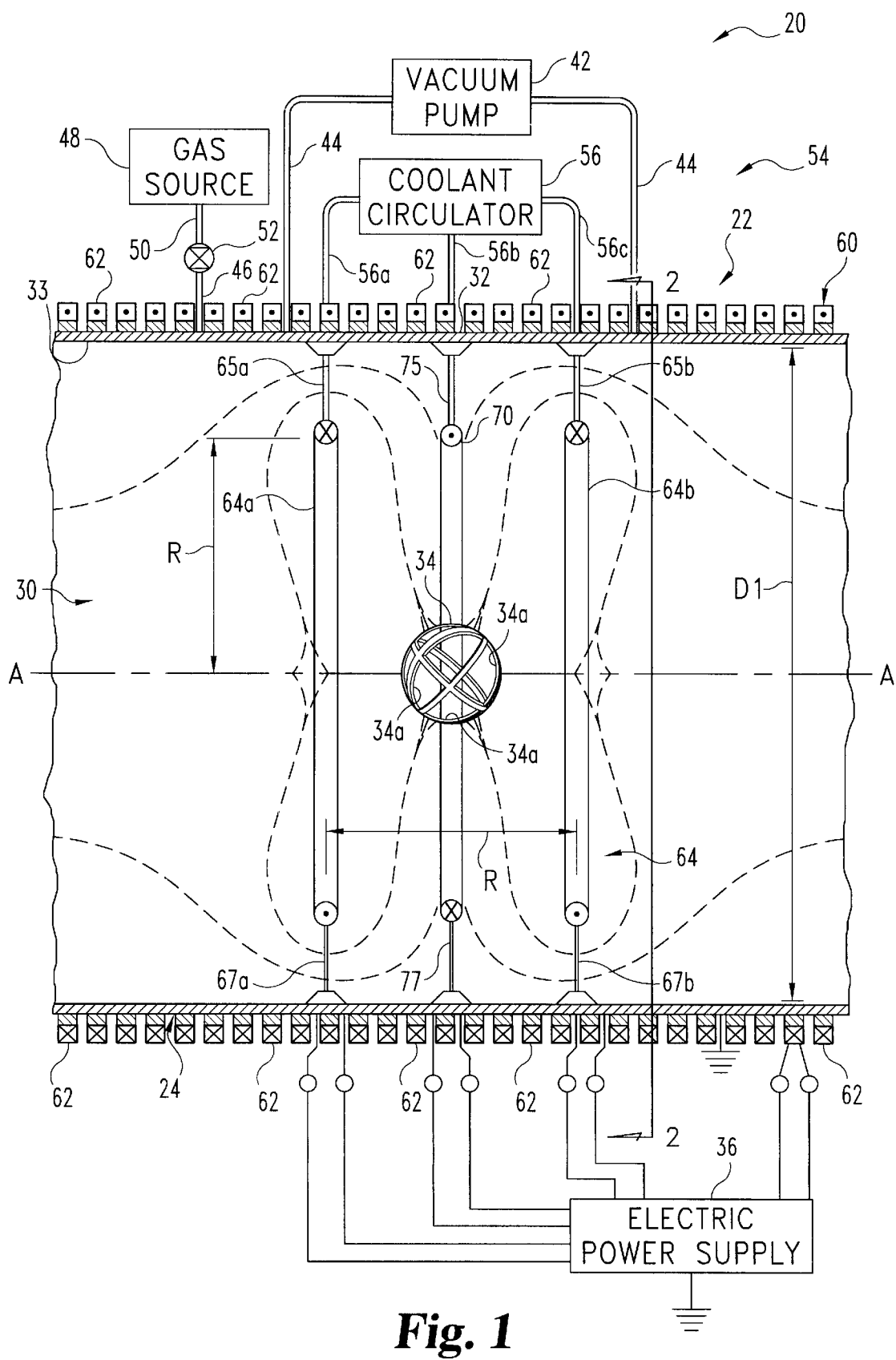
FIG. 1 is a partial, diagrammatic view of a system of one embodiment of the present invention in section.

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In one embodiment, the non-Maxwellian, beam-beam type reactions associated with Inertial Electrostatic Confinement (IEC) and reduced radiation compared to other particle generation schemes makes the IEC approach attractive for deuterium-helium 3 (D-$^3$He) reactions, proton-boron 11 reactions (p-$^{11}$B), and the like. In particular, the $^3$He(d, p) $^4$He fusion reaction is a kind of generally nonradioactive nuclear reaction that releases 164 gigawatt-hour (GWh) (about $5.92 \times 10^{14}$ joules) of energy from 1 kilogram (kg) of $^3$He fuel. For this reaction, approximately 80% of the released fusion energy is carried by protons each with an energy level of about 14.7 mega-electron-volts (MeV) and the other 20% is carried by helium 4 ($^4$He) particles each with an energy level of about 3.5 MeV. On the other hand, background fusion plasma particles have energies on the order of 80 kilo-electron-volts (KeV). In most nuclear fusion applications, the fusion products having energy levels on the order of one or more mega-electron-volts (MeVs) (such as the 14.7 MeV protons and 3.5 MeV helium particles produced by the $^3$He(d, p) $^4$He fusion reaction) can escape from the fusion plasma and their confining fields with little energy loss. The management and use of the high-energy particle momentum and/or energy for various applications such as electrical power production and/or spacecraft thrust are among the objectives of some embodiments of the present invention. Alternatively or additionally, other embodiments of the present invention can be directed to one or more different objectives, utilize one or more different target reactions, and/or employ one or more different charged particle sources.

An IEC device can produce a significant number of products that can be attractive for many applications, e.g., direct energy conversion, plasma thrust, energy recovery from particle/plasma reaction studies/experiments, industrial processing with charged particles, medical treatments with particle beams, etc. Typically, an IEC device and/or related fusion confinement systems emit these charged particles in a generally isotropic manner. A magnetic field generating device can be used to direct charged particles in such a way to increase particle flux; however, the performance of the IEC device can be adversely effected by such a magnetic field under certain circumstances.

In one embodiment of the present invention, a collimator is provided to focus a particle beam that may originate from an IEC device. This collimator includes a pair of coils arranged to control the magnetic field between these coils. A stabilizing coil can be added to such embodiments to reduce support structure requirements. In another embodiment, a coil pair in a Helmholtz configuration provides a way to reduce, if not substantially eliminate, the magnetic field from the collimator in a region local to an IEC electrode.

In a further embodiment, the recovery of energy from charged particles with one or more types of energy converters is desirable. In one form, these particles are generated by several IEC devices operated at the same time with a common container. Another form of the present invention includes a device that separates low-energy charged particles from high-energy charged particles. In still other forms, the teachings of the present application are directed to spacecraft propulsion and/or energy conversion/production.

Referring to FIG. 1, charged particle generation system 20 of one embodiment of the present invention is illustrated. System 20 includes apparatus 22 (partially shown) that provides a charged particle flow along axis A. As illustrated, apparatus 22 includes a charged particle source 24 in the form of inertial electrostatic confinement device 30. Device 30 includes container 32 defining chamber 33. Container 32 and chamber 33 each have a longitudinal centerline generally coincident with axis A. Device 30 further includes electrode 34 generally centered within chamber 33 relative to a point along axis A. Electrode 34 is configured to be operated at an electric potential different than container 32. Container 32 is partially shown in cross-section, and is generally cylindrical in shape with an inner diameter of D1.

Electrode 34 is generally spherical in shape, belonging to a class of spherical inertial electrostatic confinement (SIEC) devices. As depicted, electrode 34 includes a number of openings 34a (only a few of which are designated by reference numerals) to provide a spherically shaped grid suitable for operation in a star mode as further described in connection with U.S. Pat. No. 6,121,569 (previously incorporated by reference). Container 32 can be formed from stainless steel or such other suitable material as would occur to those skilled in the art. Electrode 34 may likewise be formed from stainless steel or a different suitable conductor as would occur to those skilled in the art.

Figure 2:
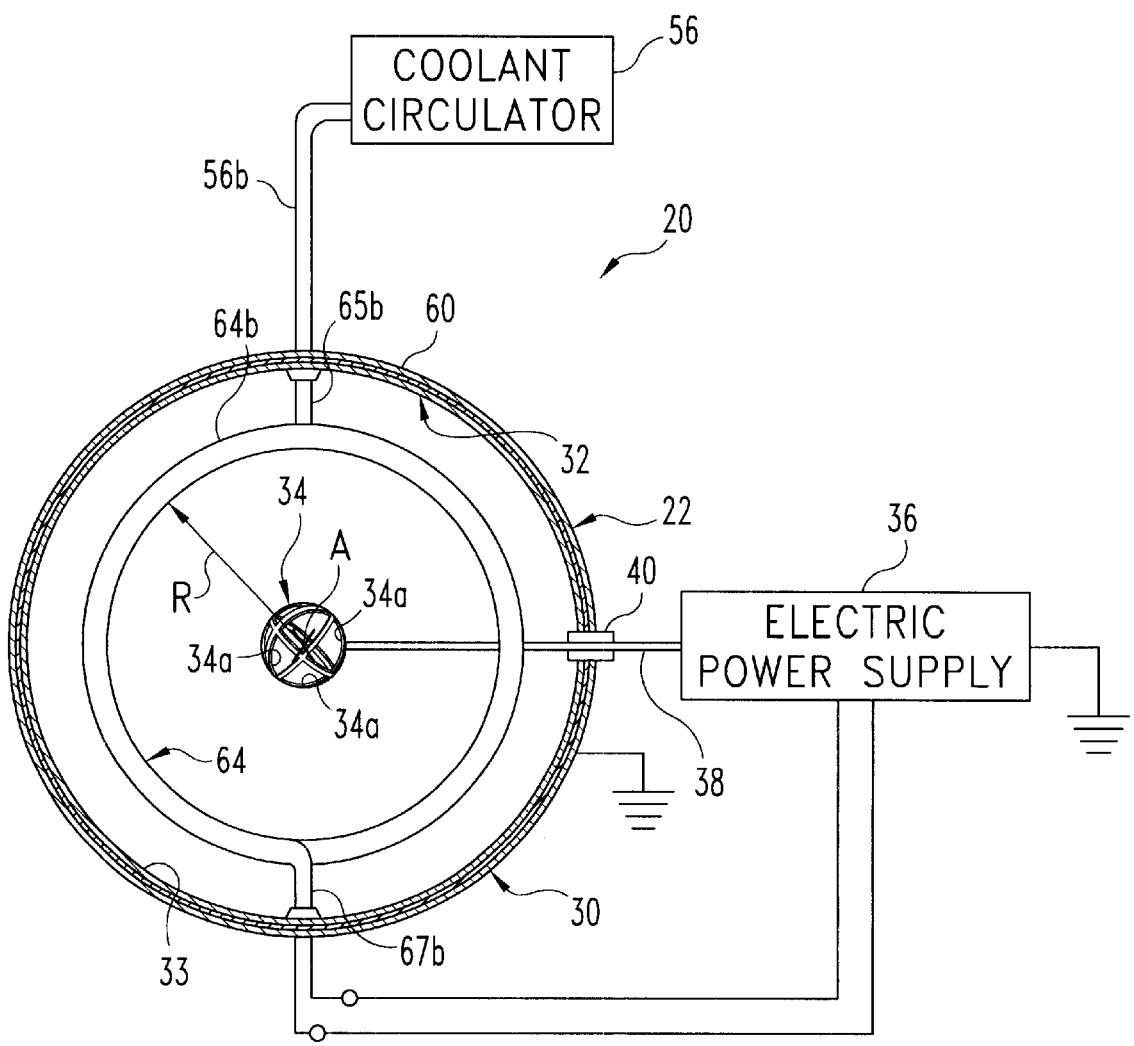
FIG. 2 is partial, diagrammatic view of the system of FIG. 1 taken along section line 2—2 shown in FIG. 1.

Referring additionally to FIG. 2, a view plane perpendicular to the view plane of FIG. 1 is provided corresponding to section line 2—2 shown in FIG. 1. Axis A is represented by cross hairs in FIG. 2 due to its perpendicularity to the view plane. As depicted in FIGS. 1 and 2, container 32 is electrically grounded. Electrode 34 is electrically connected to electric power supply 36 by conductor 38, and is electrically insulated from container 32 by insulator 40. In addition to power supply 36, IEC device 30 can be equipped with other devices not shown such as an ion injector.

Container 32 is configured to hold and maintain at least a partial vacuum. As shown in FIG. 1, such a vacuum can be provided by evacuating gas from chamber 33 through outlets 44 with vacuum pump 42. Container 32 is also configured to retain gas received through inlet 46. Gas is selectively introduced through inlet 46 from gas source 48 through conduit 50. The gas flow can be adjusted among a range of flow rates or cut-off with valve 52 that is in fluid communication with conduit 50. Gas from source 48 can include reactant materials, such as D and $^3$He, to perform the D-$^3$He reaction with IEC device 30. Pump 42, outlet 44, inlet 46, gas source 48, conduit 50, and valve 52 collectively provide gas management subsystem 54. In other embodiments, subsystem 54 includes multiple gas sources and/or multiple vacuum pumps, as are found desirable for the particular configuration. Subsystem 54 can be arranged to recover gas introduced into chamber 33 for storage, treatment to separate impurities, and/or reintroduction as appropriate.

In one mode of operation of system 20, the spherical grid configuration of electrode 34 is placed at a negative potential with electric power supply. This negative potential is in a range of about 80 to about 100 kilovolts (kV) relative to container 32 (electrically grounded). Chamber 33 is backfilled with a low-pressure gas, including D and $^3$He. The electric field generated between container 32 and electrode 34 is operable to ionize the gas introduced into chamber 33 with subsystem 54 and accelerate resulting ions toward the center of electrode 34.

Figure 3:
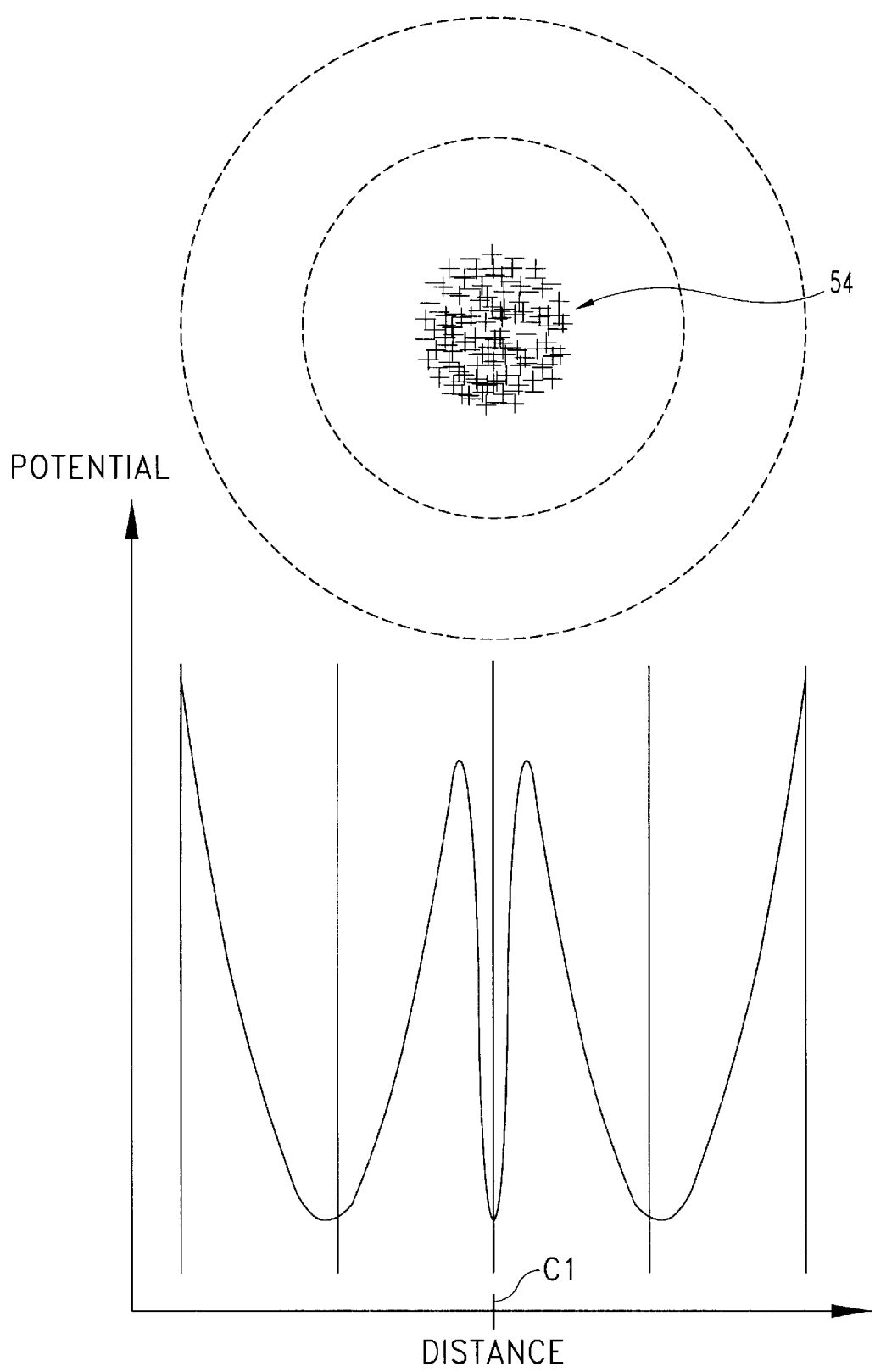
FIG. 3 is a diagram illustrating an electric potential well structure for one mode of operation of the system of FIG. 1.

As illustrated by the diagram of FIG. 3, the ions created by such an electric field converge to form a dense core region 54. As measured by G. H. Miley, Transactions on IEEE Plasma Science (2000), virtual anodes and cathodes can result that provide a spherical potential well structure because of the space-charge accumulation of ions and electrons in core region 54. This potential well structure is depicted in the electric potential-versus-distance graph relative to the center C1 of electrode 34.

The particles produced by device 30 emerge from core region 54 isotropically, which tends to minimize the particle flux crossing an imaginary spherical surface surrounding the source. To increase flux and to better direct the particle flow, charged particles can be collimated with an appropriately arranged magnetic field. Solenoid 60 is disposed about container 30 to generate a generally uniform magnetic field in a direction generally parallel to axis A when a direct electrical current flows therethrough. In accordance with general principles of electromagnetism, a charged particle with a component of velocity perpendicular to the magnetic field direction tends to circulate in orbits in a plane when exposed to a magnetic field; where such plane is perpendicular to the magnetic field direction. In keeping with this effect, the generally uniform magnetic field provided by solenoid 60 imparts a degree of gyration around the magnetic field lines on moving charged particles emitted by IEC device 30.

To enhance understanding of the present invention, a few of the relationships governing electromagnetism are provided as follows. Letting "N" turns of an electrically conductive circular coil with radius "R" in meters (m) carry "$I_C$" amperes (A) of electric current, the magnetic field "H" at the center of the coil is H=N·I/2R Ampere•Turns/meter (AT/m). For a solenoid with generally uniform windings of "n" turns in unit length and carrying the current "$I_{sol}$", the magnetic field "H" inside the solenoid can be approximated as: H=n$I_{sol}$ (AT/m) provided that the solenoid is much longer than the radius. On the other hand, magnetic flux Ψ is the number of magnetic lines of force through an area enclosed by a loop and is typically quantitized in Weber (Wb) units. The magnetic flux density B=∂ψ/∂s is related to the magnetic field by the equation B=μH (where λ is the magnetic permeability and s is the area enclosed by a loop). The magnetic permeability of free space $\mu_0$ is 4π×10$^{-7}$ Weber/Ampere•Turns-meter (Wb/AT-m). Because the magnetic permeability is a constant in free space, the magnetic field is proportional to the magnetic flux density. The magnetic flux density (Wb/m$^2$) is, therefore, traditionally utilized to represent the magnetic field in many fields of engineering; and is counted by the unit of Tesla (T).

In FIG. 1, several sectional windings 62 of solenoid 60 about container 32 are depicted; however, only a few are specifically designated by reference numerals to preserve clarity. Windings 62 are fixed to container 32 by intervening mounts. Solenoid 60 is electrically coupled to electrical power supply 36 which includes appropriate circuitry and controls to provide a direct current (DC) suitable to generate a desired magnetic field in chamber 33 with solenoid 60. A current of $I_{sol}$ through the solenoid 60 with an averaged winding of n turns in unit length outside container 32 gives a magnetic field $B_{sol}=\mu_0 n I_{sol}$ inside solenoid 60 at axis A measured in units of Tesla (T), provided that solenoid 60 is long enough to be approximated as being of infinite length.

In some applications, the presence of $B_{sol}$ in core region 54 results in undesirable performance. Coil pair 64, including coil 64a and coil 64b, are provided in a Helmholtz configuration to reduce the magnetic field in core region 54. In this configuration, coil 64a and 64b each have a radius R and are spaced apart from one another along axis A by a distance of about R. Coil 64a is positioned within container 32 by supports/mounts 65a and 67a. Coil 64b is positioned within container 32 by supports/mounts 65b and 67b. While two supports for each coil 64a and 64b are illustrated, in other embodiments, more or fewer supports or mounts may be utilized.

Coils 64a and 64b are coupled to electric power supply 36 to receive an electric current. For the illustrated embodiment, electrical connections between supply 36 and coils 64a and 64b are provided through support/mount 67a and 67b, respectively. In other embodiments, such connections can be provided through a different arrangement as would occur to those skilled in the art. The current flow through coils 64a and 64b about axis A is in a directional sense opposite the current flow in winding 62 of solenoid 60. In other words, current flows through each coil 64a and 64b in a rotational direction opposite the rotational direction through solenoid 60 (one being clockwise and the other being counter-clockwise). With respect to FIG. 1, current flowing into the view plane is represented by the symbol "x" in the respective winding cross-section (corresponding to an arrow tail) and current flowing out of the view plane is represented by the symbol "•" in the respective winding cross section (corresponding to an arrowhead).

The magnetic field attributed to the coil pair 64 can be configured to at least partially cancel the magnetic field produced by solenoid 60 in a region between coil 64a and coil 64b. If a current $I_c$ on the respective coils 64a and 64b is chosen so as to satisfy the condition $I_C=-1.3975\times R\bullet n I_{sol}$, the magnetic field at the center of the coil pair 64 on axis A generally decreases to a point in the vicinity of core 54 where it can be considered substantially eliminated. A hexapole magnetic field configuration appears around this center. The negative sign of the coil current $I_c$ represents the current direction opposite solenoid 60. The z-axis is parallel to the magnetic solenoid 60 and axis A, and distance from the center is normalized by the coil radius R. The dashed curves of FIG. 1 represent the contour of the quantity Ψ(r,z)/r; where the magnetic flux: $\Psi(r,z)\equiv\int_0^r B_z(r', z)^1 r' dr'$ is, in this case, defined by the radial integral of the z-component of the magnetic field. The quantity Ψ(r,z)/r represents the accessibility region of a particle, such that: a charged particle locates inside the spatial region where the quantity Ψ(r,z)/r is smaller than a value determined by the charge to mass ratio (q/M), the kinetic energy, and the azimuthal canonical angular momentum of the particle.

Figure 4:
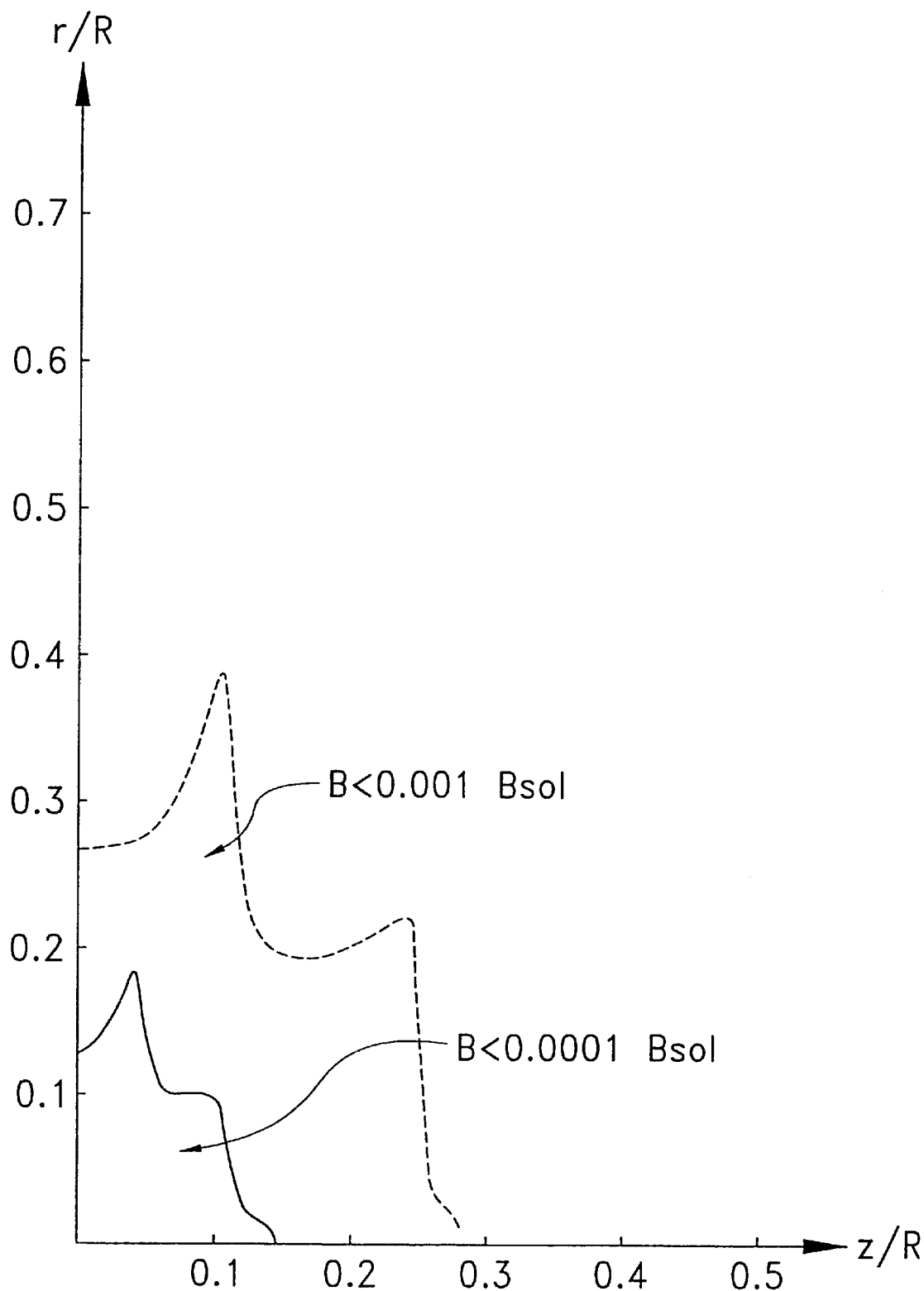
FIG. 4 is a diagram illustrating contours of a magnetic field generated with the system of FIG. 1.

The coil current $I_c$ is chosen so that the magnetic field from solenoid 60 is minimized or substantially eliminated at the midpoint on axis A between coil 64a and coil 64b and generally coincident with the center of electrode 34. In this case, the magnetic field near the center is very weak and approximately proportional to $(r^2+z^2)^2/R^4$; where "r" is distance measured in the radial direction relative to axis A, "R" is the radius to windings 62 of solenoid 60, and "z" is distance measured along axis A. The diagram of FIG. 4 is a graph of r/R-versus-z/R with representative $B_{sol}$ contours. Inside the sphere: $\sqrt{r^2+z^2}<0.22$ R, the magnetic field is less than 0.001 $B_{sol}$. Below this value the magnetic field may be considered practically as zero.

The birthplace of charged particles is near the center of IEC device 30 where the magnetic field is reduced or eliminated. The azimuthal canonical angular momentum $q\Psi(r,z)+Mrv_\theta$ is nearly zero; where q, M, and $v_\theta$ are respectively the charge, the mass, and the θ-component of velocity of the charged particle; where θ is the angle measured in a plane perpendicular to the z axis between the particle velocity vector and a fixed reference axis. Under appropriate conditions, the hexa-pole magnetic field provided by coil pair 64 can randomly change the pitch angle (angle between particle velocity and the magnetic field) of a collision-free, low-energy charged particle, such as a leaked fuel ion or thermal electron, as such particle passes through the field region. After passage, the path of the low-energy charged particle depends on the gyration phase and is practically random along the six magnetic poles expressed by zero flux surfaces, while conserving energy and canonical angular momentum. In contrast, collimated high-energy particles, such as 15 MeV protons, whose pitch length of gyrating motion is large enough, are not substantially influenced by the hexa-pole magnetic field configuration.

Figure 5:
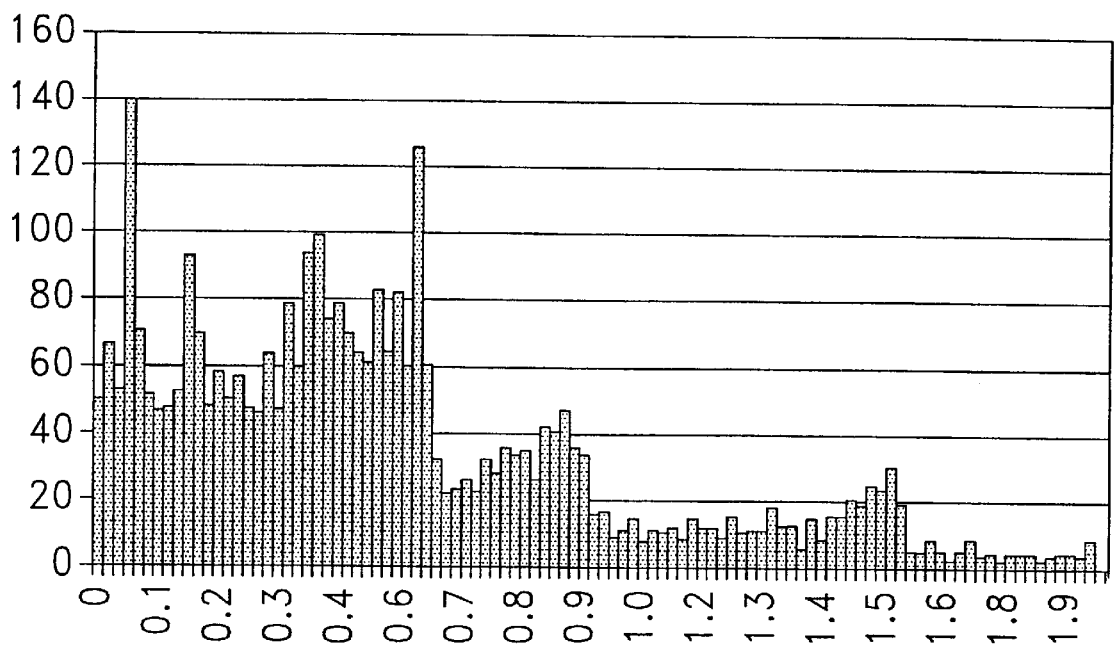
FIG. 5 is a diagram illustrating the results of numerical simulations for a selected experimental configuration of the system of FIG. 1.

Collimation with apparatus 22 was verified through computer simulation. An example of the simulation results are presented in FIG. 5. For these simulations, an isotropic D-$^3$He fusion proton source of 15 MeV is simulated at the center of coil pair 64, having a radius and coil spacing of about 1.5 m. Current on the coils 64a and 64b, and solenoid 60 are respectively $NI_c$=2.25 Mega-ampere•Turn (MAT) per meter (MAT/m) and $nI_{sol}$=1.0733 MAT/m. A radial distribution of protons are observed up to a 5 m distance from the core 54. Fusion protons are mainly centered inside the 1 meter radius, indicating collimation along the magnetic channel defined by solenoid 60.

Coils 64a and 64b carry generally the same electric current $I_c$, causing an attractive force between them of approximately $0.83 \times \mu_0 I_c^2$ for R=1.5 m. In order to collimate fusion protons and alpha particles from aneutronic fusion reactions, several hundreds thousands Ampere•Turns of coil current can be needed, resulting in an attractive force that is as strong as $5 \times 10^4$ Newtons (N), which is equivalently about 11,000 pounds (lbs). Accordingly, in one embodiment, supports 65a, 65b, 67a, and 67c are designed with a strength sufficient to maintain coil position despite such attractive forces (not shown).

In the illustrated embodiment of FIGS. 1 and 2, a stabilizing coil 70 is utilized as an alternative to such a support structure. Stabilizing coil 70 has approximately the same radius with respect to axis A as coils 64a and 64b. Coil 70 is generally positioned midway between coils 64a and 64b, and fixed to container 32 by supports/mounts 75 and 77. While two supports/mounts for coil 70 are shown, in other embodiments more of fewer can be utilized. Stabilizing coil 70 carries an electric current provided by electric power supply 36 in a direction opposite coils 64a and 64b, with a magnitude chosen so that the axial force on coil pair 64 is substantially canceled. Electrical connection of coil 70 to supply 36 can be through support/mount 77 as shown or through a different arrangement as would otherwise occur to those skilled in the art.

Typically, it is desired that the accessible domain of ions of interest be apart from any coils, supports or mounts, and the chamber wall. Electric current through coils 64a and 64b can be accordingly modified to keep the magnetic field at the center near or at zero. By modifying the previous simulation example to account for stabilizing coil 70, stabilizing coil 70 current is $I_{stb}$=0.6405RnI$_{sol}$ and the current for each coil pair 64a and 64b changes to $I_c$=−1.845RnI$_{sol}$.

For the relatively high level of electric current carried in coils 64a, 64b, and 70, a conductor cooling subsystem is utilized to circulate cooling fluid. This system includes coolant circulator 56. Circulator 56 is connected to coils 64a, 64b, and 70 via cooling conduit connections 56a, 56b, and 56c, respectively. In one form, connections 56a, 56b, 56c each include a pair of conduits that pass through supports 65a, 65b, and 75, respectively to provide a closed loop cooling path for each corresponding coil 64a, 64b, and 70. This cooling path can include one or cooling channels through and/or about the respective coil 64a, 64b, or 70. Alternatively or additionally, circulator 56 can be utilized to cool solenoid 60 (not shown) as required. While the only illustrated coolant path connections are through supports 65a, 65b, and 75, in other embodiments more and/or differently configured connections can be utilized. In still other embodiments, cooling subsystem may be used with only a subset of the coils or be absent.

One nonlimiting implementation of apparatus 22 is arranged to provide an accessible domain for 15 MeV protons from a D-$^3$He fusion reaction. For this implementation, solenoid 60 has a length of about 6 m and inner radius of about 2.1 m and is composed of 30 pancake coils each of which carries 1.524 MAT in a cross-section of about 100 millimeter (mm) width by about 153 mm height. A water-cooled copper cable carries 10 A/mm$^2$ of coil current for solenoid 60. Container 32 has a length of about 6 m, radius of about 2 m, and thickness of about 3 mm stainless steel shaped into a cylindrical vessel with ports to connect to a vacuum pump, one or more gas feeds, and current terminals. Coil pair 64 has a major radius of about 1.5 m and a minor radius of about 7.5 cm, and carries about −2.25 MAT of current. For this example, coils 64a, 64b are superconducting, being cooled with super-fluid He to carry an averaged current density as high as 130 A/mm$^2$. Each coil 64a and 64b has two stainless steel pipes each with about a 5 mm outer radius and about a 0.5 mm thickness to serve as supports/mounts 65a and 65b, and two similar pipes to serve as supports/mounts 67a, 67b connected to current terminals for current feeding. Stabilizing coil 70 has a major radius of about 1.5 m and a minor radius of about 4.4 cm to carry about 0.78 MAT of current and is in a super-fluid He-cooled superconducting form applied to carry an averaged current density of about 130 A/mm$^2$. A mount fixed to the vacuum chamber 33 supports coil 70.

In other embodiments, a controller (now shown) can be included to control one or more components of system 20. For example, an electronic controller can be coupled to electrical power supply 36, pump 42, valve 52, and/or circulator 56 to regulate operation of apparatus 22. Furthermore, such a controller can be responsive to one or more sensors (not shown) to monitor operation of apparatus 22 and adjust supply 36, pump 42, and/or valve 52 as appropriate. In further alternative embodiments, stabilizing coil 70 is absent. In still other embodiments, a coil pair desired to reduce or cancel a magnetic field in a selected region and/or a stabilizing coil can be employed to control charge particles from a source other than an IEC device.

For further embodiments, a cylindrical inertial electrostatic confinement device, a differently shaped IEC device, and/or different compositions and materials can be used in place of device 30 with appropriate adjustments to coil pair 64 and/or stabilizing coil 70. In one further embodiment, an IEC device is utilized that includes multiple electrodes each operated at a different electric potential relative to ground. U.S. Pat. No. 3,386,883 to Farnsworth (incorporated by reference herein) is cited as a source of further information concerning this multiple electrode type of IEC. In another embodiment, an alternative type of IEC device utilizes both a magnetic field and an electrostatic field. U.S. Pat. No. 4,826,646 to Bussard (incorporated by reference) is cited as a source of further information concerning this hybrid field type of IEC. As used herein, an "inertial electrostatic confinement device" refers broadly to any confinement device for performing a nuclear fusion reaction that utilizes an electrostatic field either in combination with a magnetic field or without a magnetic field. In still other embodiments, a different type of device for performing nuclear fusion and/or a different type of charged particle emitter can be used.

Figure 6:
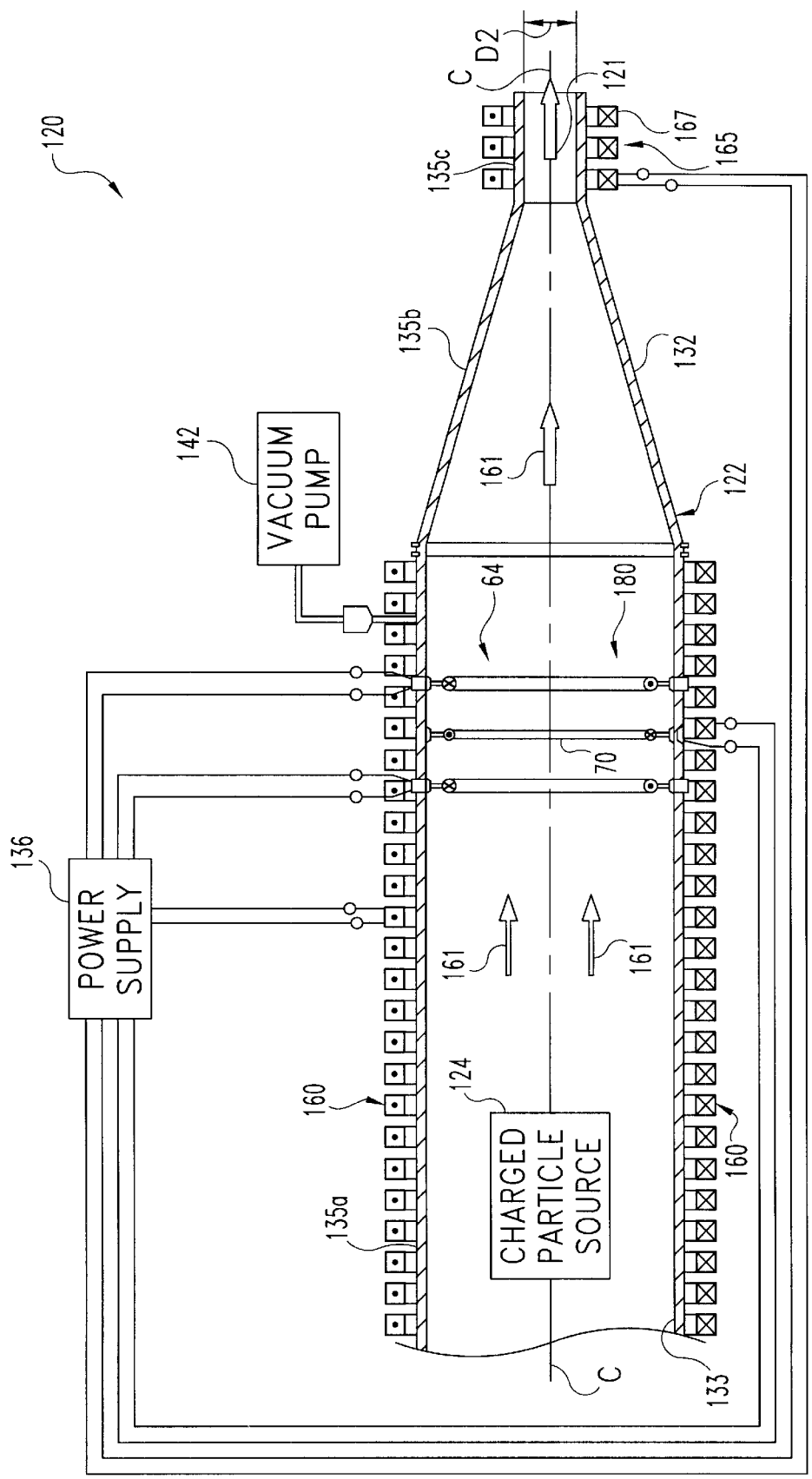
FIG. 6 is a partial, diagrammatic view of a system of another embodiment of the present invention in section.

Referring to FIG. 6, system 120 includes a charge particle generation apparatus 122 to provide a collimated charge particle beam 121 along centerline axis C. Apparatus 122 includes charged particle source 124 that can be an IEC device of the type described in connection with system 20 or a non-IEC type. Apparatus 122 includes vessel 132 defining chamber 133. Vessel 132 can be shaped and composed in a manner like container 32 and further includes a first cylindrical region 135a, a cone-shaped transition region 135b having a progressively reduced cross section, and a second cylindrical region 135c. Apparatus 122 also includes electrical power source 136 for powering various components of system 120 and vacuum pump 142 to maintain at least a partial vacuum in chamber 133. System 120 can also include a gas source (not shown) to provide material for ionization as described for IEC device 30 of system 20, a different material source, or none at all as desired for the given arrangement. Likewise, system 120 can optionally include a cooling subsystem (not shown) for one or more coils and/or a controller (not shown) to regulate operation in the manner described in connection with system 20.

Apparatus 122 also includes solenoid winding 160 to provide a magnetic field when suitable electric current is supplied from supply 136. This magnetic field defines magnetic channel 161 to direct charged particles from source 124 along a path that is generally parallel to axis C. The charged particles travelling along channel 161 encounter magnetic mirror 165. Magnetic mirror 165 is provided by solenoid 167 positioned about vessel 132 in region 135c. Vessel 132 in region 135 has diameter D2 which is less than the diameter in region 135a. When provided sufficient electric current from supply 136, magnetic mirror 165 provides a relatively strong magnetic field $B_m$ to focus charged particles in the vicinity of region 135c. For such an arrangement, a large portion of the ions encountering magnetic mirror 165 from source 124 can be deflected. Generally, only incident ions with a pitch angle θ less than the value $Tan^{-1}\sqrt{B_{sol}/(B_m-B_{sol})}$ (the loss cone) pass through region 135c of magnetic mirror 165; where $B_{sol}$ and $B_m$ are magnetic fields generated within solenoid 160 and magnetic mirror 165, respectively.

Apparatus 122 further includes collimation device 180 positioned between source 124 and magnetic mirror 165. Collimation device 180 includes coil pair 64 and stabilizing coil 70 positioned inside vessel 132 and solenoid winding 160; where like reference numerals refer to like features of system 20 previously described. The relative spatial orientation of coil pair 64 and coil 70 is like that described for system 20 as well. Supply 136 operates as a current source for the coils of collimation device 180. It has been found that the hexa-pole magnetic field configuration provided by collimation device 180 introduces a degree of pitch-angle scattering that can improve the focusing/intensity of the charged particle beam 121 emitted by magnetic mirror 165. For one configuration, the ratio of focusing radius to the initial beam radius is approximately $(B_m/B_{sol})^{1/2}$.

In one nonlimiting implementation of system 120, source 124 provides a 14.8 MeV proton beam of the type produced by D-$^3$He fusion, with collimator device 180 positioned between source 124 and magnetic mirror 165. Container 132 is comprised of stainless steel with a thickness of 3 mm and total length of 7.0 meters (m). The solenoid 167 of mirror 165 carries about 6.86 MAT/m with an inner radius of about 0.7 m that is applied for a focused beam with a radius of about 0.3 m. Five superconducting pancake coils each of which has a cross-section of about 10 centimeter (cm) width by about 10.6 cm thickness are set in every 1 meter of solenoid 167 of the mirror 165.

In alternative embodiments, collimation device 180 can be utilized in different applications in addition or as an alternative to the beam focusing application of system 120. For example, a coil pair to manage charged particles with or without a stabilization coil finds application in other embodiments.

Figure 7:
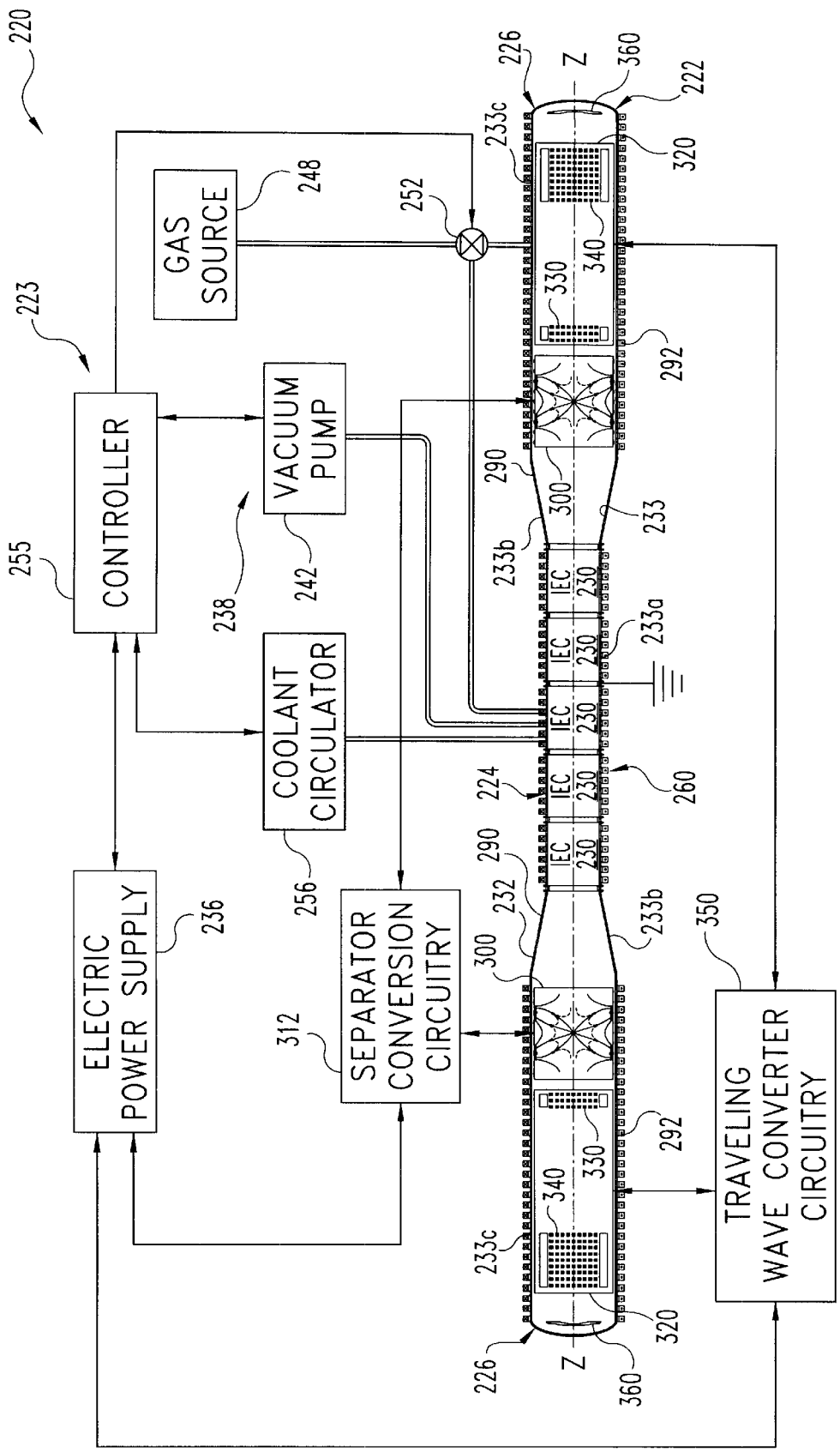
FIG. 7 is a partial, diagrammatic view of a system of still another embodiment of the present invention in section.
Figure 8:
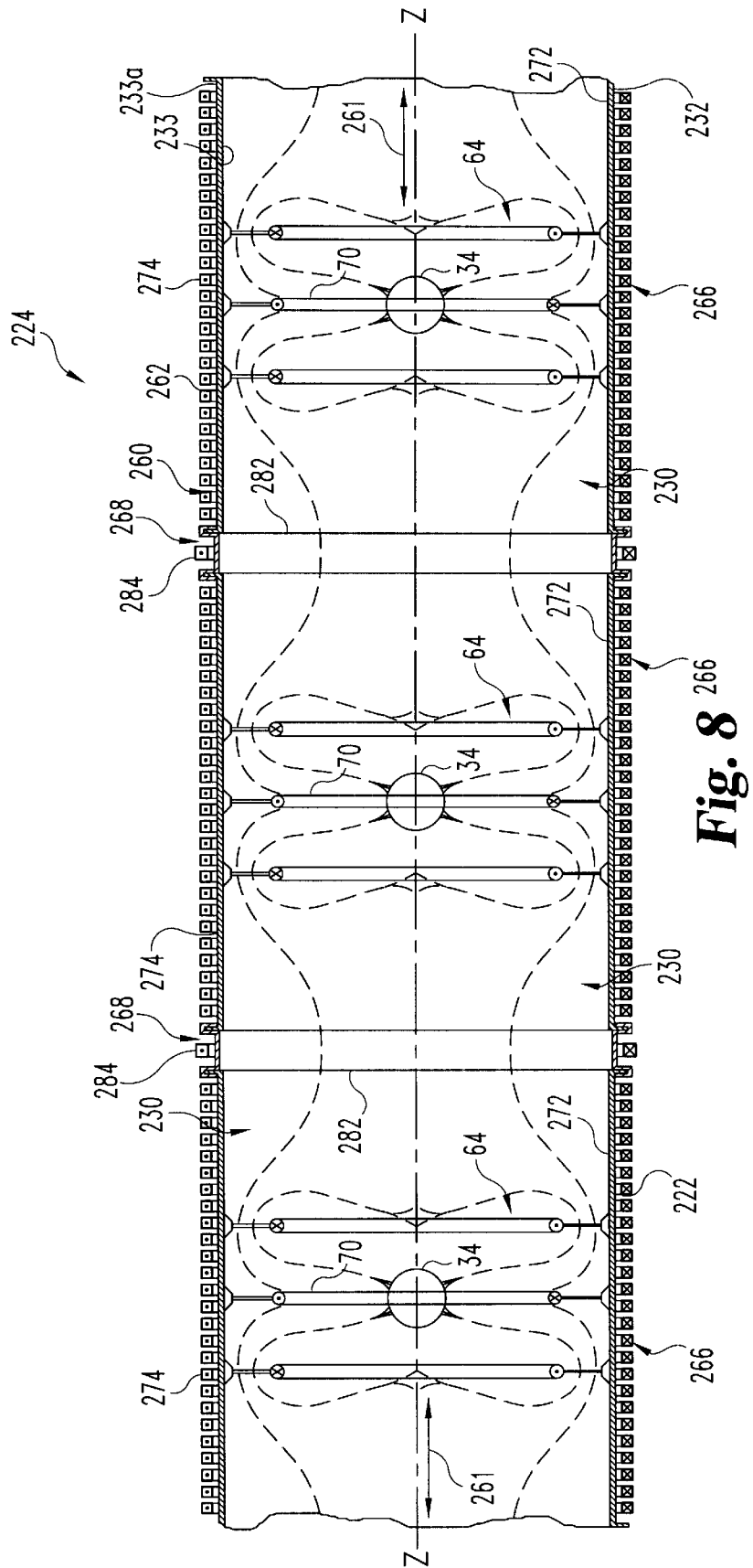
FIG. 8 is a partial, diagrammatic view showing several IEC devices of the system of FIG. 7 in section.

FIG. 7 depicts system 220 of a further embodiment of the present invention. System 220 includes reactor 222 coupled to reactor control subsystem 223. Reactor 222 includes charged particle source 224 positioned between two charged particle receiving arrangements 226. Referring additionally to FIG. 8, particle source 224 is comprised of a number of IEC devices 230 coupled together. IEC devices 230 and receiving arrangements 226 share a common container 232 longitudinally centered about axis Z. Container 232 defines chamber 233 and includes central portion 233a corresponding to particle source 224. Portion 233a is generally cylindrical and encloses a number of electrodes 34 each belonging to a different one of the IEC devices 230.

Each IEC device 230 is operable to form a high-level electrical field between its corresponding electrode 34 and container 232 to form a dense particle core region as described in connection with IEC device 30 of system 20. For the depicted embodiment, electrode 34 is the same as that described for system 20. In alternative embodiments one or more additional electrode grids may be added to IEC device 230 to create the desired electric field, IEC device 230 can be of a hybrid electrostatic/magnetic field type, and/or IEC device 230 can otherwise be modified as described in connection with IEC device 30.

Reactor control system 223 includes electric power supply 236 to supply electric power to operate IEC devices 230 and various other components of reactor 222; however, power connections between supply 236 and components of reactor 222 are not shown to preserve clarity. Control system also 223 includes gas management subsystem 238 that comprises vacuum pump 242, gas source 248, and controllable valve 252 arranged to maintain a desired level of low pressure gaseous material in chamber 233 for fusion with EC devices 230. Control system 223 also includes coolant circulator 256 coupled to reactor 222 to cool conductors as needed. Electric power supply 236, subsystem 238, and circulator 256 are operatively coupled to controller 255.

Typically, controller 255 further includes one or more sensors (not shown) to monitor operation of reactor 222 and/or one or more sources of operator data Input/Output (I/O). Controller 255 is configured with logic to regulate the operation of reactor 222 as will be described in further detail hereinafter. Controller 255 can be comprised of one or more components of any type suitable to perform reactor regulation, including digital circuitry, analog circuitry, pneumatic circuitry, hydraulic circuitry, or a combination of both. Controller 255 can be of a programmable type, such as an integrated circuit processor; a dedicated, state machine; or a combination of these. For a multiple processor form of controller 255, distributed, pipelined, and/or parallel processing can be utilized as appropriate. Controller 255 can include memory, oscillators, control clocks, interfaces, signal conditioners, filters, limiters, Analog-to-Digital (A/D) converters, Digital-to-Analog (D/A) converters, communication ports, and/or other types of operators as would occur to those skilled in the art to implement the present invention.

Magnetic field generator 260 includes a number of electrical current carrying windings 262 disposed about portion 233a of container 232 to define a magnetic channel 261 generally parallel to axis Z to direct charged particles emitted by IEC devices 230. Magnetic field generator 260 is powered by electric power supply 236 as regulated by controller 255.

IEC devices 230, central portion 233a of container 232, and generator 260 are comprised of a number of IEC units 266 connected together by connection units 268. As illustrated in the partial view of FIG. 8, each IEC unit 266 corresponds to a different one of IEC devices 230 and includes a corresponding section 272 of container 232, having a generally circular cross-section along axis Z, and respective external winding 274 of generator 260. Within section 272 is electrode 34 of the corresponding IEC device 230 that is positioned between members of coil pair 64. Also included is stabilizing coil 70 disposed inside section 272 between the members of coil pair 64 and about electrode 34. For each IEC unit 266, electrode 34, coil pair 64 and stabilizing coil 70 are configured as described in connection with system 20 with corresponding connections to supply 236 and coolant circulator 256 (not shown to preserve clarity).

Each connection unit 268 connects together two IEC units 266. Connection unit 268 includes a corresponding section 282 of container 232 that has a generally circular cross-section along axis Z. Also included is an adjustment coil 284 of generator 260 disposed about section 282. The electric current flow through coil 284 can be adjusted via controller 255 relative to windings 274 to generally eliminate the magnetic field at the center of each IEC unit 266 despite the interconnected units 266.

At each opposing end of section 233a along axis Z, container 232 includes a cone-shaped transition portion 233b. An IEC unit 266 or connection unit 268 of source 224 can be used to connect to each portion 233b. Portions 233b are each connected to a respective end portion 233c for a corresponding receiving arrangement 226. Each end portion 233c has a generally circular cross-section along axis Z with a larger diameter than sections 272 or 282 of portion 233a.

Figure 9:
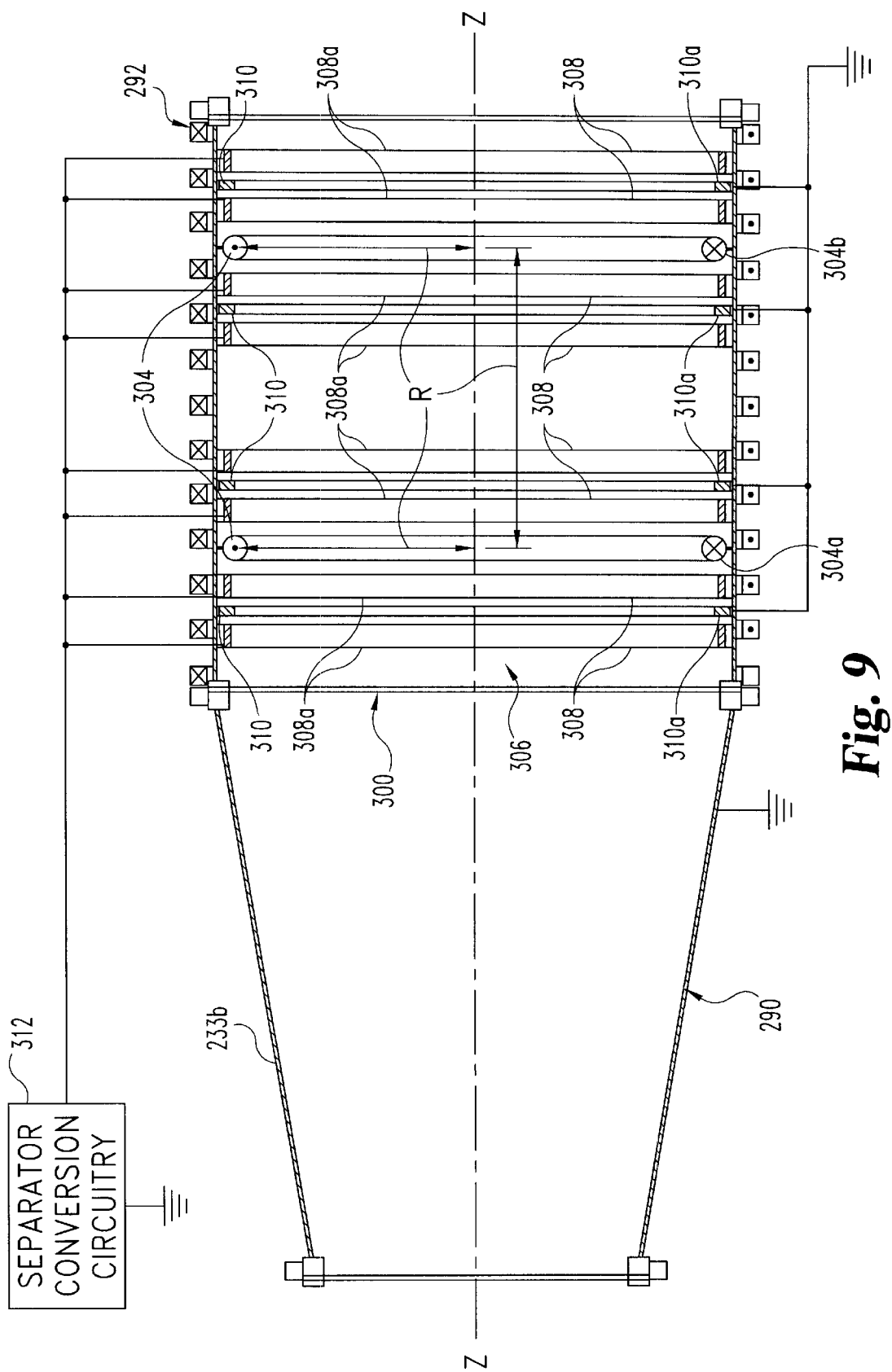
FIG. 9 is a partial, diagrammatic view of an expander and separator of the system of FIG. 7 in section.

Collectively, the combined IEC units 266 of source 224 can be operated to increase the total power and charged particle output compared to a single IEC device. The charged particles provided from source 224 move in opposite directions along axis Z toward transition portions 233b. Referring to FIGS. 7 and 9, transition portions 233b are each configured to provide a magnetic expander 290. Each magnetic expander 290 promotes the flow of charged particles into each of the two end portions 233c by at least partially converting charged particle velocity components perpendicular to the magnetic field into velocity components parallel to the magnetic field. The resulting particle beam flux density decreases, reducing the degree of particle interactions and reducing collective behavior of the particles like a plasma.

Each charged particle receiving arrangement 226 includes a corresponding end portion 233c of container 232 and solenoid 292. Solenoid 292 is disposed about end portion 233c external to container 232, being generally centered with respect to axis Z, and powered by a connection to electric power supply 236. Each receiving arrangement 226 also includes a particle separator 300 to receive particles from magnetic expander 290.

Referring to FIGS. 7 and 9, a representative particle separator 300 is illustrated. FIG. 9 illustrates the right-most separator 300 shown in FIG. 7 that receives right-flowing particles from source 224. It should be understood that the other separator 300 shown in FIG. 7 is configured in a like manner but oriented to receive left-flowing particles from source 224. Particle separator 300 includes electric current carrying coil pair 304 comprised of coil 304a and coil 304b. Coils 304a, 304b have generally the same radius R with respect to axis Z and are spaced apart from one another along axis Z a distance approximately the same as R. Coil pair 304 is connected to electric power supply 236. This Helmholtz orientation of coil pair 304 is generally the same as coil pair 64 and provides a corresponding hexa-pole magnetic field as represented by dashed field lines in FIG. 7.

Separator 300 includes a number of electrically conductive collectors 306. Collectors 306 includes positive ion collection members 308 and electron collection members 310. Collection members 308 are in the form of electrically conductive rings 308a generally centered about axis Z inside container 232. Collection members 310 are in the form of electrically conductive rings 310a generally centered about axis Z inside container 232. Rings 308a are electrically isolated from container 232. In contrast, rings 310a are in electrical contact with container 232, sharing a common electrical ground.

During operation, separator 300 receives charged particles from source 224 through magnetic expander 290. Four poles of the magnetic field provided by the coil configuration of separator 300 are terminated with electrically conductive collectors 306. Low-energy charged particles are scattered by the hexa-pole field such that a substantial quantity travel along the four terminated poles. Among the objectives of apparatus 300 is to separate these lower energy charged particles out from the general particle flow, and then further separate the low-energy particles into electrons and positively charged ions to generate a net electrical current. The high-energy charged particles are not substantially deflected/scattered by the hexa-pole magnetic field of separator 300. Instead, such high-energy particles tend to pass through separator 300.

For electrons scattered along the magnetic poles, the accessible domain is relatively narrow, forming along zero flux surfaces because of the relatively small mass of electrons. In contrast, scattered positively charged ions that travel along the magnetic poles have a much larger mass compared to electrons, resulting in an accessible domain that is relatively broader than that for electrons. Rings 310a are sized and positioned to terminate the electron accessible domains at earth potential (electrical ground). Rings 308 are sized and positioned to terminate the accessible domain of low-energy positively charged particles, and are electrically biased at about +100 kilovolts (kV).

The bias on rings 308a is provided by separator conversion circuitry 312 and may be derived from electric power supply 236. Because of the higher escape velocity of electrons, the resultant potential of bulk plasma inside separator 300 is positive and low-energy positive ions are accelerated toward rings 308a. For this arrangement, a substantial portion of the electron energy is converted to positive ion energy through a change in plasma potential. Thus an electromotive force is generated between rings 308a and ground. Separator conversion circuitry 312 routes this electrical energy (electricity) to electric power supply 236, an electrical load (not shown), and/or elsewhere, providing appropriate power signal conditioning, limiting, and/or filtering as desired.

In one nonlimiting implementation of separator 300 configured for 14.8 MeV proton beam D-$^3$He fusion, solenoid 292 has a length of about 6.5 m and inner radius of about 3.2 m and is composed of 12 pancakes each of which carries 0.103 MAT in a cross-section of about 80 millimeters (mm) width by about 130 mm thickness. A water-cooled copper cable carries about 10 A/mm$^2$ of coil current for generator 292. End portion 233c has a length of about 6.5 m, a radius of about 3.1 m, and a thickness of about 3 mm of stainless steel in the form of a cylindrical vessel. Collectors 306 are installed inside the container wall of end portion 233a. Each member coil pair 304 has a major radius of about 3.0 m with respect to axis Z and a cross-section with a radius of about 3.6 centimeters (cm) (the minor radius) to carry a current of about −0.2 MAT. For this implementation, each member of coil pair 304 is superconducting with liquid-He cooling to carry an averaged current density of about 50 A/mm$^2$. Collectors 306 include metallic ribbon rings 310a for collecting electrons and metallic ribbon rings 308a for collecting ions. The inner radius of each of the rings 310a is about 3.0 m and its cross-section is about 10 cm in thickness and about 2 cm in width. Each ring 310a is fixed to the chamber directly to keep its potential at zero. For this implementation, each of the rings 308a has an interior channel to facilitate circulation of a cooling fluid (not shown) and an inner radius of about 3.0 m. The cross-section of each ring 308a has a thickness of about 5 cm with a width of about 25 cm.

The separation of low-energy particles from high-energy particles during the operation separator 300 operation provides a filtered output of high-energy particles by substantially reducing the relative number of low-energy ions and electrons from such output. This type of filtering can be used to provide a beam that has a generally monoenergetic level of charged particles. This type of filtered beam can be utilized for efficient direct energy conversion to electricity or as a beam source in industrial, medical, and/or other technological areas. In one alternative embodiment, two or more separators 300 are installed in series to provide a greater degree of filtering between low and high energy charged particles.

Figure 10:
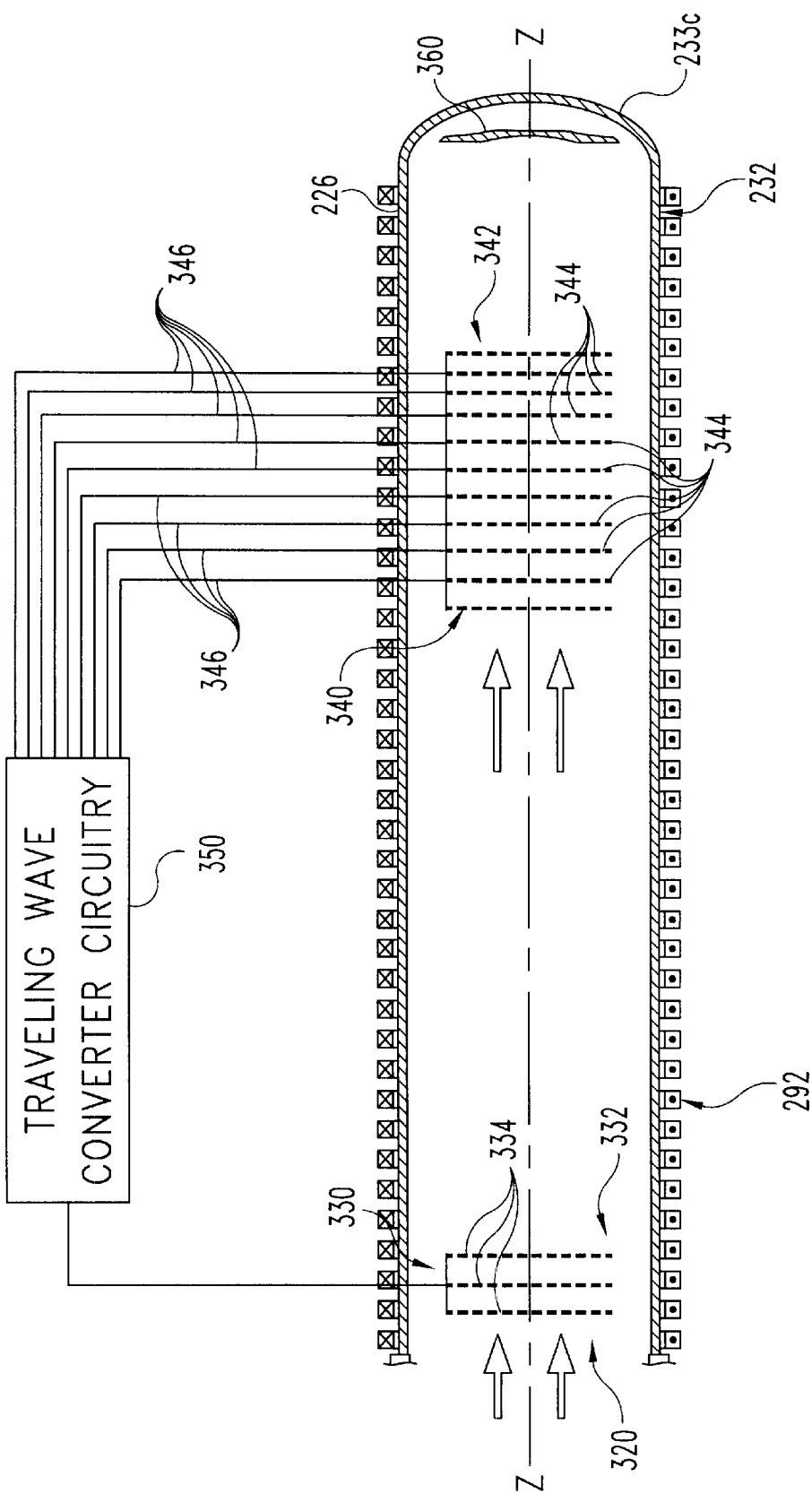
FIG. 10 is a partial diagrammatic view of a traveling wave converter of the system of FIG. 7 in section.

Another application of a generally monoenergetic particle beam output by separator 300 is to perform further energy conversion. Referring to FIGS. 7 and 10, one form of energy recovery/conversion is provided with traveling wave converter 320. FIG. 10 illustrates the right-most converter 320 shown in FIG. 7 that receives right-flowing particles from the right-most separator 300. It should be understood that the other converter 320 shown in FIG. 7 is configured in a like manner but oriented to receive particles from the left-most separator. Converter 320 receives charged particles from separator 300 to recover electrical energy therefrom. Converter 320 includes beam modulator 330 and decelerator 340 both coupled to converter circuitry 350. Modulator 330 is comprised of conductive members 332 in the form of grids 334 within container 232. Grids 334 are positioned across the particle beam path output by separator 300. Modulator 330 electrically modulates the flow velocity of charged particles to form a flowing array of bunches of charged particles, or "charged particle pulses" that move toward decelerator 340. Modulator 330 is driven to oscillate at selected frequency.

Decelerator 340 includes an array of conductive members 342 spaced apart from one another along axis Z. Members 342 are in the form of grids 344 that are placed across the pathway of the charged particle pulses from modulator 330. An alternating electromotive force is induced in grids 344 as the charged particle pulses pass through, decelerating the particles at the same time. Particles that pass through all grids 344 encounter barrier plate 360.

A transmission line 346 connects each grid 344 to circuitry 350 to feed at least a portion of the recovered alternating electricity to drive modulator 330. Any remaining electrical power converted from the particle beam with converter 320 can be routed to electrical power supply 236, an electrical load, or elsewhere with appropriate conditioning, limiting, filtering, rectifying, and the like being performed by circuitry 350, as desired. It has been found that the amplitude of the oscillation excited on the transmission line for a given grid 344 is proportional to the electromotive force on such grid multiplied by the Q-value of the resonance of the oscillating circuit, which is inversely proportional to the load resistance R for the power output from the transmission line. This finding is based on an equivalent circuit having a capacitance C1 between each adjacent pair of the transmission line terminals for grids 344, and an inductor L1 and load resistance R1 in series to ground from each transmission line terminal. Furthermore, efficient performance of the converter 320 depends on selection of the spacing between grids 344 relative to the wave number form the transmission line with the frequency of the oscillating circuit being set at generally the same frequency as the modulated beam. "Momota et al., Direct Energy Conversion for IEC Fusion for Space Applications, American institute of Aeronautics and Astronautics, AIAA 2000-3609 (July 2000) is referenced as a source of additional background information concerning this type of traveling wave converter and is hereby incorporated by reference. In another embodiment, a different type of converter can alternatively or additionally be used for the recovery/conversion of electricity from high-energy charged particles such as described in G. H. Miley, *FUSION ENERGY CONVERSION*, American Nuclear Society, 1976.

In one embodiment utilizing the D-$^3$He nuclear fusion reaction, system 220 provides power and/or propulsion for a spacecraft. Notably, this type of reaction is typically desirable for space propulsion and/or power generation because of its relatively low radioactivity and relatively high reactivity compared to other schemes. In appropriate space applications, a structure that is not gas-tight can be used in lieu of an evacuated container for one or more IEC devices because of the vacuum of space. System 220 could be modified to include a particle beam for propulsion and/or its electrical output could be used for powering an electric thruster and/or station keeping. In alternative embodiments, system 220 can be used for terrestrial power supply, or such different applications as would occur to those skilled in the art. Other embodiments of system 220 are modified such that more or fewer receiving arrangements and/or more or fewer IEC devices utilized. In another form, one receiving arrangement and/or IEC device of system 220 is configured differently than one or more other receiving arrangements and/or IEC devices, respectively.

Many alternative embodiments and combinations of the apparatus of the present invention are envisioned. In one alternative, one or more windings to generate a magnetic field could be internal to a container/vessel or embedded in a container/vessel wall. Other alternatives could combine the collimator, IEC device(s), separator(s), and/or converter (s) of different systems 20, 120, 220 in a single system embodiment. A further embodiment provides a particle beam output for medical, industrial, and/or propulsion purposes and also includes one or more energy converters or separators to recover/provide electrical power.

Another embodiment of the present invention is an apparatus including an IEC device, a solenoid and a pair of coils in the solenoid. The coil pair can be positioned to reduce the magnetic field present in the IEC. In a further form, a stabilization coil is provided between the coil pair.

A further embodiment includes generating a charged particle beam with an IEC and collimating the beam with a pair of coils positioned inside a solenoid. The coils can be of a Helmholtz arrangement configured to locally reduce the magnetic field generated by the solenoid.

Still another embodiment includes a particle separator with one or more charged particle collectors and a pair of coils positioned in a solenoid. This separator can be used to filter a charged particle beam. In one form such beam is generated with an IEC. In still a further form, the IEC-generated beam is collimated with a pair of coils configured to reduce the magnetic field generated by an outer solenoid.

Yet another embodiment includes a number of IEC units coupled together along a magnetic channel. A solenoid can be included to provide the channel. One or more pairs of coils arranged to control the magnetic field generated by the solenoid can also be included.

In still a further embodiment, a traveling wave converter or a related type of electrostatic energy converter is connected to an IEC charged particle source by a magnetic channel. An expander and/or separator can be disposed between the IEC source and the converter. Alternatively or additionally, a number of IEC sources can be used together along the magnetic channel. In one form, this arrangement is utilized for spacecraft propulsion, station keeping, and/or power generation.

Another embodiment of the present invention is a stabilized hexa-pole collimator unit installed in a magnetic channel for collimating multi-directional or isotropic charged particle beam from a beam source at a generally null magnetic field. This unit comprises a pair of coils with an equal radius whose spacing is equal to the radius (Helmholtz coil) and a stabilization coil inside a vacuum chamber in a coaxial solenoid coil. The pair coils are supported mechanically by thin pipes for feeding coil current and coolant, which make bombardment losses of particle minimum. The current on the paired coils are of the opposite sense relative to the solenoid and the stabilization coil so as to reduce the magnetic field near the center.

A further embodiment includes a number of hexa-pole collimator units for obtaining a large output from a number of smaller IEC units. These units can be connected together by a corresponding connection units each having a coil. Both ends of a series of hexa-pole collimator units may be connected to a direct energy converter system through a magnetic expander to perform a fusion power system.

Still a further embodiment includes establishing a magnetic channel for focusing a beam source by disposing one or more collimator units between a beam source and a magnetic mirror along the channel.

In another embodiment of the present invention, a hexa-pole separator unit is provided that is configured to filter electrons and low energy ions from a high-energy particle beam. The separator unit can be installed downstream of an expander. The separator includes one or more collectors to collect electrons and one or more collectors to collect ions below a threshold energy level. The separator collectors can further be arranged to provide for direct energy conversion of the electrons and lower energy ions.

All publications, patents, and patent applications cited in this specification are herein incorporated by reference as if each individual publication, patent, or patent application were specifically and individually indicated to be incorporated by reference and set forth in its entirety herein. Further, any theory, mechanism of operation, proof, or finding stated herein is meant to further enhance understanding of the present invention, and is not intended to limit the present invention in any way to such theory, mechanism of operation, proof, or finding. While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined herein and by the following claims are desired to be protected.

What is claimed is:

1. An apparatus, comprising:
   an inertial electrostatic confinement device including a container and being operable to provide charged particles in said container;
   a winding disposed relative to said container to generate a magnetic field to direct the charged particles within said container; and
   a pair of coils positioned within said container and inside said winding, said pair of coils being operable to control strength of the magnetic field between said pair of coils.

2. The apparatus of claim 1, wherein said inertial electrostatic confinement device includes at least one electrode positioned between said pair of coils.

3. The apparatus of claim 1, further comprising a plurality of electrically conductive rings disposed adjacent said pair of coils within said container.

4. The apparatus of claim 1, wherein said coils are positioned relative to said inertial electrostatic confinement device to collimate at least a portion of the charged particles.

5. The apparatus of claim 1, wherein said pair of coils are operable to carry electric current in a direction opposite said winding to reduce the strength of the magnetic field.

6. The apparatus of claim 1, further comprising a stabilizing coil positioned between said pair of coils, said stabilizing coil being operable to carry an electric current in a direction opposite each of said pair of coils.

7. The apparatus of claim 1, further comprising an electrostatic energy converter positioned to receive at least a portion of the charged particles to provide electric power.

8. An apparatus, comprising:
   a magnetic field generator operable to generate a magnetic field;
   an inertial electrostatic containment device including at least one electrode; and
   a pair of coils separated from one another to define a space therebetween, said at least one electrode being positioned in said space between said pair of coils, said pair of coils being operable to reduce strength of the magnetic field in at least a portion of said space.

9. The apparatus of claim 8, wherein said pair of coils are each generally circular, a first one of said pair of coils has a first radius and a second one of said pair of coils has a second radius approximately equal to said first radius.

10. The apparatus of claim 8, wherein said pair of coils are spaced apart from one another by an distance corresponding to a radius of at least one of said pair of coils.

11. The apparatus of claim 8, wherein said at least one electrode has a generally spherical profile with openings to provide for a star mode of operation of said inertial electrostatic confinement device.

12. The apparatus of claim 8, further comprising a container defining a chamber, said at least one electrode and said pair of coils being positioned in said chamber, said magnetic field generator including a winding disposed outside said chamber to provide the magnetic field to direct charged particles provided with said inertial electrostatic confinement device.

13. The apparatus of claim 12, wherein said winding is operable to conduct current in a first direction, and said pair of coils are each operable to direct current in a second direction opposite said first direction to reduce strength of the magnetic field between said pair of coils.

14. The apparatus of claim 13, further comprising a stabilizing coil positioned between said pair of coils within said container, said stabilizing coil being operable to conduct current in said first direction.

15. The apparatus of claim 14, further comprising an electrostatic energy converter operable to receive at least a portion of the charged particles to generate electric power.

16. An apparatus, comprising:
a source to provide charged particles;
a winding operable to generate a magnetic field channel to direct the charged particles;
a pair of spaced apart coils operable to reduce strength of the magnetic field channel in a space between said pair of coils, said winding being disposed about said pair of coils; and
one or more charged particle collectors disposed adjacent said pair of coils and about the magnetic field channel when generated with said winding, said one or more charged particle collectors being operable to collect at least a portion of the charged particles for conversion to electrical power.

17. The apparatus of claim 16, wherein said source includes one or more inertial electrostatic confinement devices.

18. The apparatus of claim 16, wherein said pair of coils are each generally circular with approximately the same radius and said coils are spaced apart from one another by a distance approximated equal to said radius.

19. The apparatus of claim 16, wherein said charged particle collectors number at least two, a first one of said collectors being oriented to collect electrons and a second one of said collectors being oriented to collect positively charged ions to produce an electric current.

20. The apparatus of claim 16, wherein said one or more charged particle collectors number more than one and include at least two electrically conductive rings positioned between said pair of coils.

21. The apparatus of claim 20, wherein a first one of the rings has a diameter equal to or greater than a diameter of a second one of the rings.

22. The apparatus of claim 16, further comprising a container, said winding being disposed about said container.

23. The apparatus of claim 22, wherein said one or more charged particle collectors number at least two and include a first collector in electrical contact with said container and a second collector at a different electric potential that said first collector during operation of said one or more charged particle collectors.

24. The apparatus of claim 16, wherein said one or more charged particle collectors number more than one and are configured as a plurality of conductive rings positioned in correspondence with accessibility regions of respective species of particles.

25. An apparatus, comprising:
a plurality of inertial electrostatic confinement devices each operable to provide charged particles, said inertial electrostatic confinement devices being located along a magnetic field channel to direct the charged particles; and
an energy converter including one or more electrically conductive members in said magnetic field channel, said energy converter being operable to receive at least a portion of the charged particles to provide electric power.

26. The apparatus of claim 25, further comprising a container and one or more windings about said container operable to generate the magnetic field channel.

27. The apparatus of claim 26, further comprising a number of pairs of coils, said pairs each corresponding to a different one of said inertial electrostatic confinement devices, said pairs each being operable to reduce the magnetic filed between a first member of the pair and a second member of the pair during operation of said winding.

28. The apparatus of claim 27, further comprising a number of stabilizing coils each corresponding to a different one of said pairs of coils.

29. The apparatus of claim 25, wherein said energy converter includes a pair of coils and said one or more electrically conductive members include a number of charged particle collectors positioned about said magnetic field channel.

30. The apparatus of claim 29, further comprising a container and wherein:
said winding is disposed about said container;
said coils and said charged particle collectors are disposed within said container; and
said charged particle collectors include a plurality of rings, a first one of said rings being in electrical contact with said container and a second one of said rings being at an electric potential relative to said first one of said rings.

31. The apparatus of claim 25, further comprising an expander positioned between said one or more inertial electrostatic confinement devices and said energy converter.

32. The apparatus of claim 31, wherein said energy converter includes a modulator and a decelerator, said decelerator including said one or more electrically conductive members.

33. The apparatus of claim 32, further comprising an energy converting separator positioned between said expander and said energy converter, said energy converting separator including two coils spaced apart from each other and one or more charged particle collectors, said energy converting separator being operable to convert a first portion of the charged particles to electrical power and pass a second portion of the charged particles to said energy converter, particles of said first portion being of lower kinetic energy than particles of said second portion.

* * * * *